US011999259B2

(12) United States Patent
Bae

(10) Patent No.: US 11,999,259 B2
(45) Date of Patent: Jun. 4, 2024

(54) POWER CONTROL METHOD AND POWER CONTROL APPARATUS FOR A VEHICLE

(71) Applicants:HYUNDAI MOTOR COMPANY, Seoul (KR); KIA CORPORATION, Seoul (KR)

(72) Inventor: JungHyeon Bae, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 352 days.

(21) Appl. No.: 17/499,613

(22) Filed: Oct. 12, 2021

(65) Prior Publication Data
US 2022/0194260 A1    Jun. 23, 2022

(30) Foreign Application Priority Data
Dec. 22, 2020    (KR) .......................... 10-2020-0181112

(51) Int. Cl.
*B60L 58/13*    (2019.01)
*B60L 58/16*    (2019.01)
(Continued)

(52) U.S. Cl.
CPC .............. *B60L 58/13* (2019.02); *B60L 58/16* (2019.02); *B60L 58/20* (2019.02); *B60L 58/25* (2019.02); *B60L 2210/10* (2013.01)

(58) Field of Classification Search
CPC .......... B60L 58/13; B60L 58/16; B60L 58/20; B60L 58/25; B60L 2210/10; B60L 2240/545; B60L 3/0046; B60L 58/12; B60L 58/15; B60L 58/26; B60L 53/20; B60L 2240/547; H02M 3/285; H02M 1/32;
(Continued)

(56) References Cited

U.S. PATENT DOCUMENTS 7,923,866 B2 *   4/2011  Ichikawa .............. B60L 3/0046
                                                    307/29
8,030,880 B2 *  10/2011  Alston ................... H02J 7/1423
                                                    320/103
(Continued)

FOREIGN PATENT DOCUMENTS

EP         2871091 A2 *   5/2015  ............... B60L 1/00
KR      20200103534 A  *   9/2020  ............... H02J 7/35
WO    WO-2011158086 A2 *  12/2011  ........... B60L 11/1816

*Primary Examiner* — M Baye Diao
(74) *Attorney, Agent, or Firm* — Lempia Summerfield Katz LLC

(57) ABSTRACT

A method for controlling power of a vehicle includes: collecting, by a controller, data on a current consumed by an electrical load of the vehicle and calculating an average current consumption for the electrical load based on the collected data on the current consumed; determining, by the controller, power conversion of a converter to generate a converted current having an amount corresponding to the calculated average current consumption; variably controlling, by the controller, the power conversion of the converter to compensate for a deterioration state of a battery when the deterioration state of the battery provided to supply power to the electrical load occurs; and securing, by the controller, higher power conversion efficiency of the converter by controlling power supply to the electrical load when the deterioration state of the battery does not occur.

18 Claims, 10 Drawing Sheets

(51) Int. Cl.
*B60L 58/20* (2019.01)
*B60L 58/25* (2019.01)

(58) Field of Classification Search
CPC .......... H02M 3/33507; B60Y 2200/91; Y02T 10/70; Y02T 10/7072
USPC ....................................................... 320/127
See application file for complete search history.

(56) References Cited

U.S. PATENT DOCUMENTS

| | | | |
|---|---|---|---|
| 9,156,466 B2* | 10/2015 | Huber | B60W 10/08 |
| 9,272,627 B2* | 3/2016 | Miller | B60L 3/0046 |
| 10,170,908 B1* | 1/2019 | Catalano | H02J 7/0068 |
| 10,358,049 B2* | 7/2019 | Kazuno | B60L 58/31 |
| 10,532,666 B2* | 1/2020 | Yoon | B60L 53/20 |
| 11,254,214 B2* | 2/2022 | Bae | H02J 13/00004 |
| 2003/0107352 A1* | 6/2003 | Downer | B60L 58/20 322/40 |
| 2020/0195033 A1* | 6/2020 | Tajima | H02J 7/342 |
| 2020/0338990 A1* | 10/2020 | Jang | B60L 8/003 |
| 2020/0395627 A1* | 12/2020 | Kilburn | H02J 7/00714 |
| 2022/0113356 A1* | 4/2022 | Kasselman | H01M 10/4257 |
| 2022/0231537 A1* | 7/2022 | Hirota | H02J 7/16 |

* cited by examiner

FIG. 4

| | AVERAGE CURRENT CONSUMPTION (A) | | | |
|---|---|---|---|---|
| | LESS THAN 30 | 30~70 | 71~110 | 111 OR MORE |
| PHASE CONTROL SECTION | Phase 1 | Phase 1 | Phase 1 | Phase 1 |
| | Phase 2 | Phase 2 | Phase 2 | Phase 2 |
| | Phase 3 | Phase 3 | Phase 3 | Phase 3 |
| | Phase 4 | Phase 4 | Phase 4 | Phase 4 |

FIG. 5

| Temp(°C) | SOC (%) | | | | | |
|---|---|---|---|---|---|---|
| | < 50 | 60 | 70 | 80 | 90 | 100 |
| < -15 | | | | | | |
| 0 | | | | | | |
| 10 | | | | | | |
| 25 | | | | | | |
| 40 < | | | | | | |

DETERIORATION    GOOD

POWER CONTROL METHOD AND POWER CONTROL APPARATUS FOR A VEHICLE

CROSS-REFERENCE TO RELATED APPLICATION(S)

This application is based on and claims priority under 35 U.S.C. § 119 to Korean Patent Application No. 10-2020-0181112, filed on Dec. 22, 2020 in the Korean Intellectual Property Office, the disclosure of which is incorporated herein by reference in its entirety.

TECHNICAL FIELD

The present disclosure relates to a vehicle, and more particularly, to supply power to electrical loads of the vehicle.

BACKGROUND

A direct current-direct current (DC-DC) converter applied to a vehicle that uses a motor to drive, such as an eco-friendly vehicle, is a component that converts power of a main battery of high voltage into power of a relatively low voltage. An efficiency of power conversion of the DC-DC converter is a very important factor in terms of efficient use of electrical energy. In particular, in an electric vehicle that does not have a separate internal combustion engine and runs using only a motor, the efficiency of power conversion of the DC-DC converter directly affects cruising distance of the vehicle.

As a technology for increasing the efficiency of power conversion of the DC-DC converter, a multi-phase DC-DC converter has been also applied as a major technology. However, a conventional multi-phase DC-DC converter has disadvantages such as difficulty in efficient control on/off between each phase and an output voltage drop in phase activation processes for increasing power conversion capacity.

SUMMARY

An aspect of the present disclosure is to secure stability of a vehicle's power supply while increasing efficiency of power conversion of a DC-DC converter. This is done through phase variable control of the DC-DC converter based on a state of a battery in a vehicle to which a multi-phase DC-DC converter is applied and through power supply control to an electrical load.

An aspect of the present disclosure provides a method for controlling power of a vehicle. The method for controlling power includes collecting, by a controller, data on a current consumed by an electrical load of the vehicle and calculating an average current consumption for the electrical load based on the collected data on the current consumed. The method also includes determining, by the controller, power conversion of a converter to generate a converted current having an amount corresponding to the calculated average current consumption. The method also includes variably controlling, by the controller, the power conversion of the converter to compensate for a deterioration state of a battery when the deterioration state of the battery provided to supply power to the electrical load occurs. The method also includes securing, by the controller, higher power conversion efficiency of the converter by controlling power supply to the electrical load when the deterioration state of the battery does not occur.

The converter may include a multi-phase DC-DC converter.

Variable controlling of the power conversion of the converter may include variably controlling the number of phase activations of the multi-phase DC-DC converter.

The method may further include increasing, by the controller, the number of phase activations of the converter to compensate for the deterioration state of the battery when the deterioration state of the battery occurs.

The method may further include determining, by the controller, that the deterioration state of the battery occurs when a state of charge (SOC) and a temperature of the battery are respectively within predetermined ranges.

When the deterioration state of the battery does not occur, controlling power supply to the electrical load may further include identifying, by the controller, whether a large current consuming load consuming a large current greater than or equal to a predetermined amount among the electrical loads is operating. Controlling power supply may also include blocking, by the controller, power supply to a predetermined convenient load among the large current consuming loads when the large current consuming load is in operation.

The predetermined convenient load may be not directly related to driving and safety of the vehicle and be an electrical load predetermined for convenience of occupants.

The method may further include identifying, by the controller, whether the current consumption in the electrical load decreases when the large current consuming load is not in operation and may include increasing, by the controller, an amount of charge of the battery by the reduced current consumption when the current consumption in the electrical load is reduced.

Another aspect of the present disclosure provides a power control apparatus for a vehicle. The power control apparatus includes a converter configured to supply power to an electrical load and a battery and includes a controller configured to control power supply to the electrical load and the battery by controlling the converter. The controller is configured to collect data on a current consumed by the electrical load of the vehicle and calculate an average current consumption for the electrical load based on the collected data on the current consumed. The controller is also configured to determine power conversion of the converter to generate a converted current having an amount corresponding to the calculated average current consumption. The controller is also configured to variably control the power conversion of the converter to compensate for a deterioration state of a battery when the deterioration state of the battery provided to supply power to the electrical load occurs. The controller is also configured to secure higher power conversion efficiency of the converter by controlling power supply to the electrical load when the deterioration state of the battery does not occur.

The converter may include a multi-phase DC-DC converter.

Variable controlling of the power conversion of the converter may include variably controlling the number of phase activations of the multi-phase DC-DC converter. The controller may be configured to increase the number of phase activations of the converter to compensate for the deterioration state of the battery when the deterioration state of the battery occurs, The deterioration state of the battery may be determined based on a SOC and a temperature of the battery. The controller may be configured to determine that the deterioration state of the battery occurs when the SOC and the temperature of the battery are respectively within predetermined ranges.

For controlling power supply to the electrical load when the deterioration state of the battery does not occurs, the controller may be configured to identify whether a large current consuming load consuming a large current greater than or equal to a predetermined amount among the electrical loads is operating. The controller may be also configured to block power supply to a predetermined convenient load among the large current consuming loads when the large current consuming load is in operation.

The predetermined convenient load may be not directly related to driving and safety of the vehicle and may be an electrical load predetermined for convenience of occupants.

The controller may be configured to identify whether the current consumption in the electrical load decreases when the large current consuming load is not in operation. The controller may be also configured to increase the amount of charge of the battery by the reduced current consumption when the current consumption in the electrical load is reduced.

Another aspect of the present disclosure provides a method for controlling power of a vehicle. The method for controlling power includes collecting data on a current consumed by an electrical load of the vehicle and calculating an average current consumption for the electrical load based on the collected data on the current consumed. The method also includes determining power conversion of a multi-phase DC-DC converter to generate a converted current having an amount corresponding to the calculated average current consumption. The method also includes increasing the number of phase activations of the multi-phase DC-DC converter to compensate for a deterioration state of a battery when the deterioration state of the battery provided to supply power to the electrical load occurs. The method also includes securing higher power conversion efficiency of the multi-phase DC-DC converter by selectively restricting power supply to the electrical load when the deterioration state of the battery does not occur.

Another aspect of the present disclosure provides a power control apparatus for a vehicle. The power control apparatus includes a converter configured to supply power to an electrical load and a battery and includes a controller configured to control power supply to the electrical load and the battery by controlling the converter. The controller is configured to collect data on a current consumed by an electrical load of the vehicle and calculate an average current consumption for the electrical load based on the collected data on the current consumed. The controller is also configured to determine power conversion of a multi-phase DC-DC converter to generate a converted current having an amount corresponding to the calculated average current consumption. The controller is also configured to increase the number of phase activations of the multi-phase DC-DC converter to compensate for a deterioration state of a battery when the deterioration state of the battery provided to supply power to the electrical load occurs. The controller is also configured to secure higher power conversion efficiency of the multi-phase DC-DC converter by selectively restricting power supply to the electrical load when the deterioration state of the battery does not occur.

BRIEF DESCRIPTION OF THE DRAWINGS

These and/or other aspects of the disclosure should become apparent and more readily appreciated from the following description of the embodiments, taken in conjunction with the accompanying drawings, of which:

FIG. 4 is a view showing a phase control section setting of the DC-DC converter 104 according to an embodiment of the present disclosure;

FIG. 5 is a view showing a criterion for determining a state of a low-voltage battery 106 of a power control apparatus according to an embodiment of the present disclosure.

DETAILED DESCRIPTION

Figure 1:
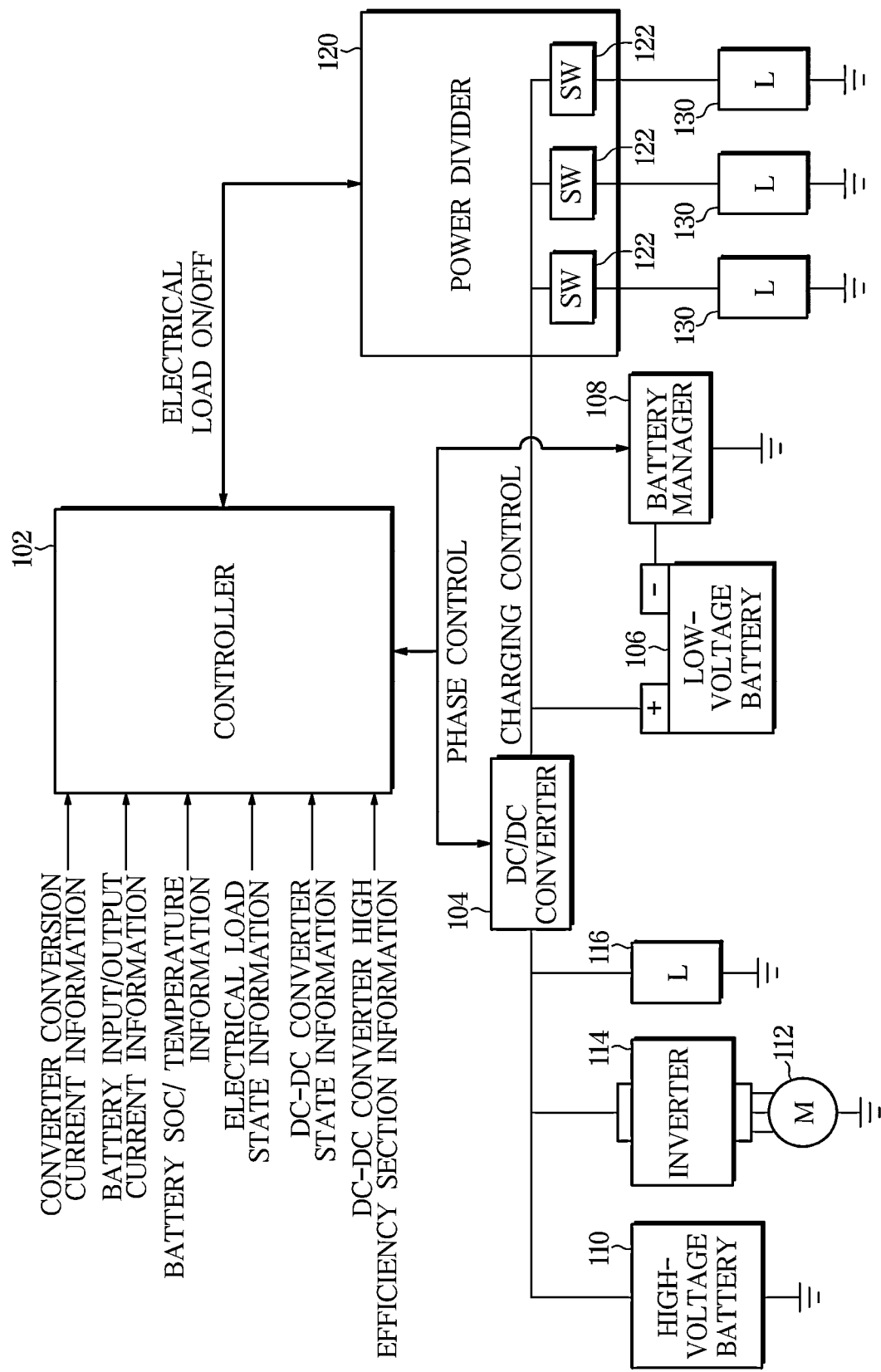
FIG. 1 is a view showing a power control apparatus for a vehicle according to an embodiment of the present disclosure.

Reference is now made in detail to the embodiments of the present disclosure, examples of which are illustrated in the accompanying drawings, wherein like reference numerals refer to like elements throughout. This specification does not describe all elements of the disclosed embodiments and detailed descriptions of well-known elements in the art or redundant descriptions on substantially the same configurations have been omitted. The terms 'part', 'module', 'member', 'block', and the like as used in the specification may be implemented in software or hardware. Further, a plurality of 'part', 'module', 'member', 'block', and the like may be embodied as one component. It is also possible that one 'part', 'module', 'member', 'block' and the like includes a plurality of components.

Throughout the specification, when an element is referred to as being "connected to" another element, it may be directly or indirectly connected to the other element and the phrase "indirectly connected to" includes being connected to the other element via a wireless communication network.

Also, it should be understood that the terms "include" and "have" are intended to indicate the existence of elements disclosed in the specification and are not intended to preclude the possibility that one or more other elements may exist or may be added.

Throughout the specification, when a member is located "on" another member, this includes not only when one member is in contact with another member but also when another member is present between the two members.

The terms 'first', 'second', and the like are used to distinguish one component from another component and the component are not limited by the terms described above.

An expression used in the singular encompasses the expression of the plural, unless it has a clearly different meaning in the context used herein.

The reference numerals used in operations are used for descriptive convenience and are not intended to describe the order of operations and the operations may be performed in a different order unless otherwise stated. When a component, device, element, or the like of the present disclosure is described as having a purpose or performing an operation, function, or the like, the component, device, or element should be considered herein as being "configured to" meet that purpose or to perform that operation or function.

Hereinafter, embodiments of the present disclosure are described in detail with reference to the accompanying drawings.

FIG. 1 is a view showing a power control apparatus for a vehicle according to an embodiment of the present disclosure. The power control apparatus is configured to supply electrical power to a motor 112 and an electrical load 130.

As shown in FIG. 1, the power control apparatus for the vehicle according to an embodiment of the present disclosure includes a high-voltage battery 110, a direct current-direct current (DC-DC) converter 204, an inverter 114, a low-voltage battery 106, a power divider 120, a battery manager (also referred to as intelligent battery sensor (IBS)) 108, and a controller 102.

Figure 2:
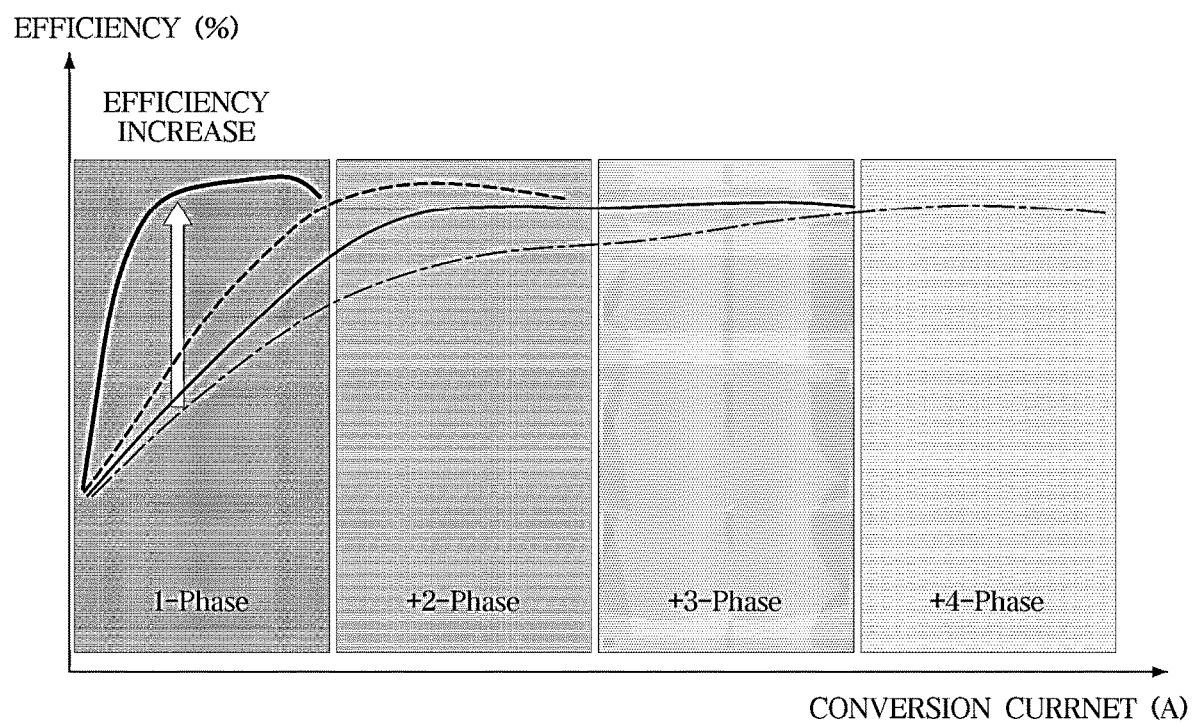
FIG. 2 is a view showing a multi-phase power conversion of a DC-DC converter 104 according to an embodiment of the present disclosure.

The DC-DC converter 104 converts high-voltage DC of a high-voltage battery 202 into a lower-voltage DC. The DC-DC converter 104 converts the high-voltage DC of the high-voltage battery 202 into alternating current (AC), then steps down the alternating current through a coil, a transformer, a capacitor, and the like and rectifies it, and then converts it to the lower-voltage DC. The DC voltage stepped-down by the DC-DC converter 104 is supplied to the low-voltage battery 106 and the electrical load 130. The DC-DC converter 104 shown in FIG. 1 is a multiphase converter. The DC-DC converter 104 is formed by connecting a plurality of power converting stages for driving a common electrical load in parallel. A multi-phase power conversion is performed by the plurality of power conversion stages connected in parallel. FIG. 2 is a view showing the multi-phase power conversion of the DC-DC converter 104 according to an embodiment of the present disclosure. As shown in FIG. 2, a magnitude of conversion current may be gradually increased through the multi-phase power conversion. However, as a power conversion phase increases, a power conversion efficiency decreases. Therefore, when priority is given to the power conversion efficiency, reducing the number of power conversion phases is desirable. When a larger amount of conversion current is required, increasing the number of power conversion phases is desirable.

Returning to FIG. 1, a DC voltage of the high-voltage battery 110 is converted into the AC voltage having a predetermined phase and frequency by the inverter 114 and then supplied to the motor 112. Rotational force and speed of the motor 112 are determined by an output voltage of the inverter 114. In addition, the DC voltage of the high-voltage battery 110 is also supplied to a high voltage load 116 that requires a high voltage.

The battery manager 108 performs functions such as a battery cell management of the low-voltage battery 106, a state of charge (SOC) check, overcharge and prevention of overcharge, fault diagnosis, cooling control, emergency power cutoff, and the like.

The power divider 120 controls on/off a switch 122 connected to each load of the electrical load 130 in response to an electrical load on/off control command generated from the controller 102. By the on/off control of the switch 122 by the power divider 120, converted power of the DC-DC converter 104 is supplied to the electrical load 130 (when turned on) or blocked (when turned off).

In the power control apparatus shown in FIG. 1, the controller 210 controls overall operations of the power control apparatus. To this end, converter conversion current information, battery input/output current information, battery SOC/temperature information, electrical load state information, converter state information, converter high efficiency section information, and the like are input to the controller 102. The control unit 102 controls the power conversion phase of the DC-DC converter 104 based on the input information and controls power supply to the electrical load 130 through the power divider 120.

Figure 3:
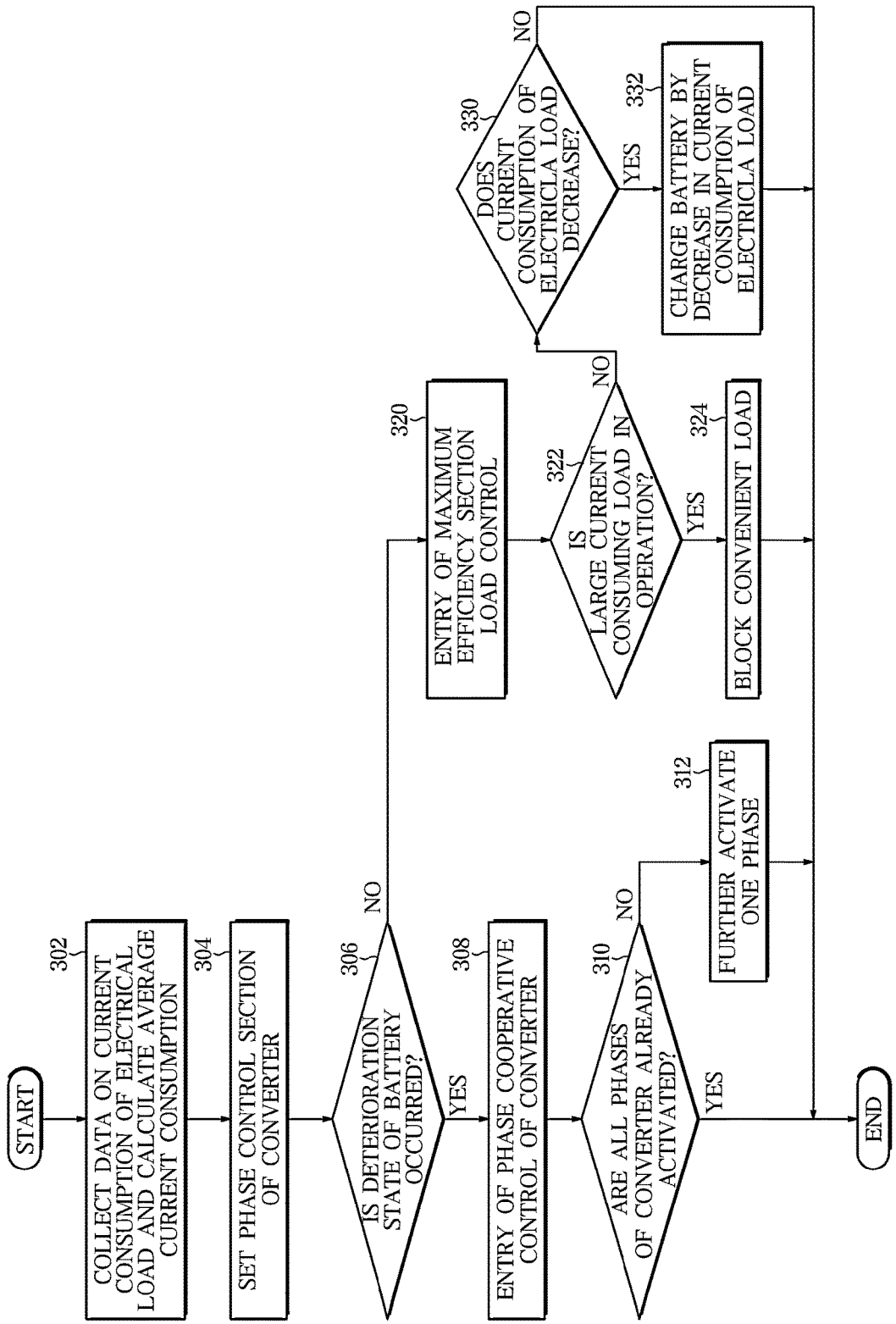
FIG. 3 is a view showing a method for controlling power supply of a vehicle according to an embodiment of the present disclosure.

FIG. 3 is a view showing a method for controlling power supply of a vehicle according to an embodiment of the present disclosure.

Referring to FIG. 3, the controller 102 collects data on a current consumed by the electrical load of the vehicle and calculates an average current consumption of the electrical load based on the collected data of the current consumption (302).

The controller 102 sets a phase control section of the DC-DC converter 104 based on a calculated result of the average current consumption of the electrical load of the vehicle (304). The magnitude of conversion current generated by power conversion of the DC-DC converter 104 is determined by a setting of the phase control section. In other words, according to the calculated result of the average current consumption of the electrical load of the vehicle, it is determined how many phases among the multiple phases of the DC-DC converter 104 are to be activated and the DC-DC converter performs the multi-phase power conversion according to the determined number of phases. The multi-phase power conversion of the DC-DC converter 104 generates a conversion current of a magnitude corresponding to the number of activated phases. When the total number of phases of the DC-DC converter 104 is 4, the number of phases activated for power conversion may be a minimum of 1 and a maximum of 4. FIG. 4 is a view showing a phase control section setting of the DC-DC converter 104 according to an embodiment of the present disclosure. As shown in FIG. 4, when the average current consumption of the vehicle is less than 30 A, only one phase (Phase 1) is activated. When the average current consumption of the vehicle is 30~70 A, two phases (Phase 1, Phase 2) are activated. When the average current consumption of the vehicle is 71~110 A, three phases (Phase 1, Phase 2, and Phase 3) are activated. When the average current consumption of the vehicle is 111 A or more, all phases (Phase 1, Phase 2, Phase 3, and Phase 4) are activated.

Returning to FIG. 3, the controller 102 monitors a state of the low-voltage battery 106 and identifies whether the deterioration state of the low-voltage battery 106 occurs (306). When the deterioration state of the low-voltage battery 106 occurs, performance of input and output of the low-voltage battery 106 is also degraded. Accordingly, the controller 102 selects one of <phase control> and <maximum efficiency section load control> of the DC-DC converter 104 according to whether the deterioration state of the low-voltage battery 106 occurs. For example, the controller 102 performs <phase control> of the DC-DC converter 104 when the deterioration state of the low-voltage battery 106 occurs. On the contrary, the controller 102 performs <maximum efficiency section load control> of the DC-DC converter 104 when the state of the low-voltage battery 106 is good. FIG. 5 is a view showing a criterion for determining the state of the low-voltage battery 106 of the power control apparatus according to an embodiment of the present disclosure. Referring to FIG. 5, by comparing the SOC (%) and a temperature of the low-voltage battery 106 with a predetermined reference value, <deterioration> state and <good> state of the low-voltage battery 106 may be classified.

Returning to FIG. 3, when the deterioration state of the low-voltage battery 106 occurs (YES in 306), the controller 102 enters a phase cooperative control of the DC-DC converter 104 (308). The phase cooperative control of the DC-DC converter 104 refers to adjust an amount of conversion current by variably controlling power conversion performance of the DC-DC converter 104. The controller 102 determines the number of phase activations of the DC-DC converter 104 so as to generate conversion current that matches the average current consumption of the vehicle's electrical load in the phase cooperative control of the DC-DC converter 104. Referring to FIG. 4, since entry of the phase cooperative control of the DC-DC converter 104 (108) is a case in which the SOC of the low-voltage battery 106 is deteriorated (YES in 306), in the phase cooperative control of the DC-DC converter 104, increasing the number of phase activations of the DC-DC converter 104 in order to compensate for the deterioration of the low-voltage battery 106 is desirable.

Therefore, after entering the phase cooperative control of the DC-DC converter 104, if all phases of the DC-DC converter 104 are already activated (YES in 310), the controller 102 maintains active state of all phases of the DC-DC converter 104 as it is.

Figure 6:
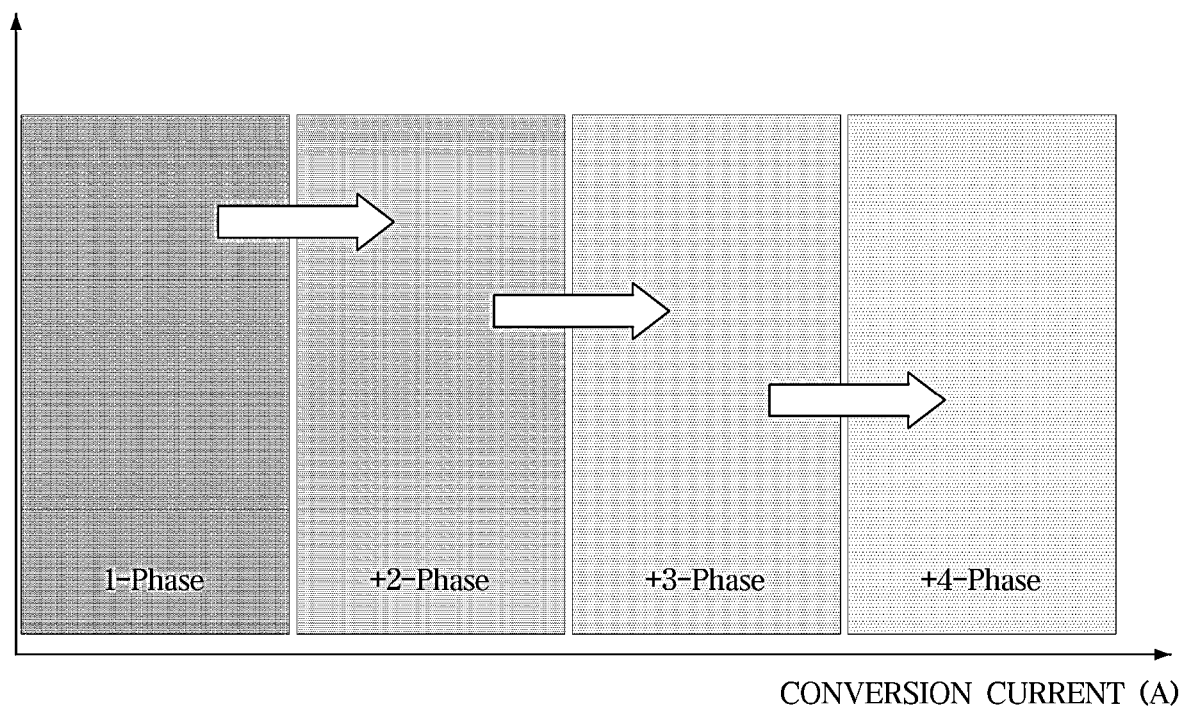
FIG. 6 is a view showing an additional phase control of the DC-DC converter of a power control apparatus according to an embodiment of the present disclosure.

On the other hand, after entering the phase cooperative control of the DC-DC converter 104, if the all phases of the DC-DC converter 104 is not activated (No in 310), the controller 102 further activates one phase of the DC converter 104 (312). FIG. 6 is a view showing an additional phase control of the DC-DC converter 104 of the power control apparatus according to an embodiment of the present disclosure. Referring to FIG. 6, after entering the phase cooperative control of the DC-DC converter 104, if one phase (phase 1) of the DC-DC converter 104 is activated, the controller 102 further activates one phase (phase 2). Alternatively, if two phases (phase 1, phase 2) of the DC-DC converter 104 are activated, the controller 102 further activates one phase (phase 3). Alternatively, if three phases (phase 1, phase 2, and phase 3) of the DC-DC converter 104 are activated, the controller 102 further activates one phase (phase 4). The additional activation of the phases of the DC-DC converter 104 is not limited to additionally activating one at a time and may additionally activate two or more at a time or three or more at a time.

Figure 7:
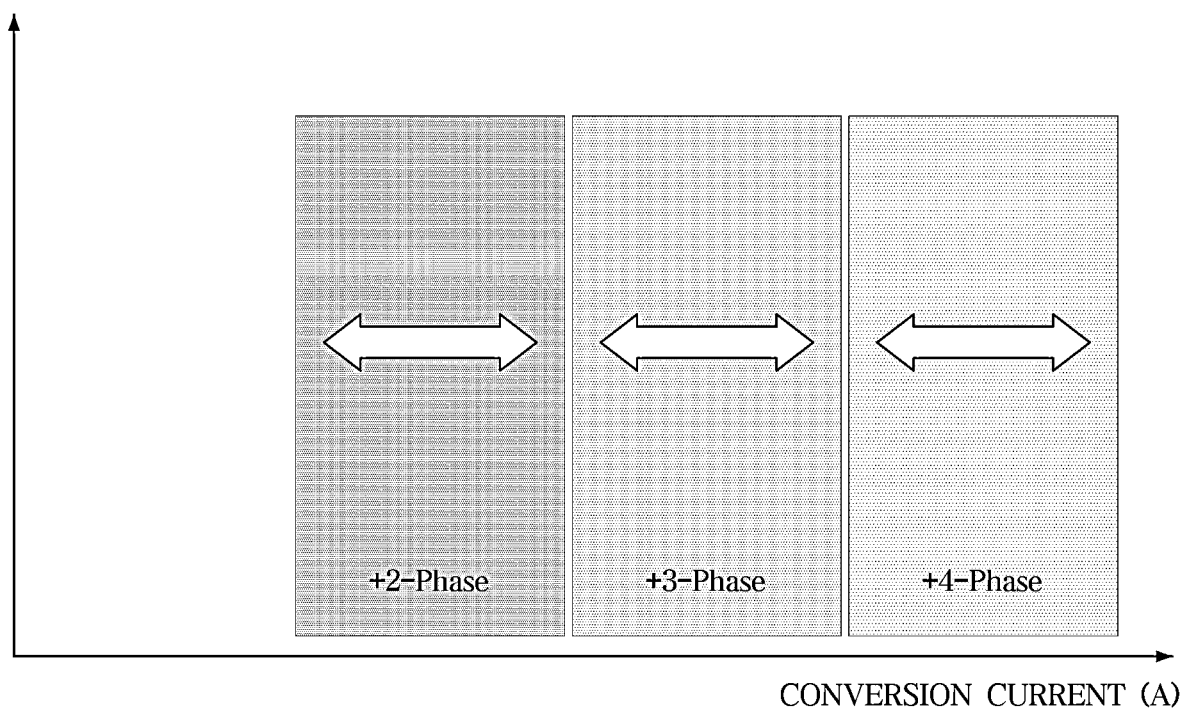
FIG. 7 is a view showing phase activations of the DC-DC converter in a maximum efficiency section load control of the power control apparatus according to an embodiment of the present disclosure.

Returning to FIG. 3, in operation 306, if the state of the low-voltage battery 106 is good, it has been described that <maximum efficiency section load control> is performed. In other words, if the deterioration state of the low-voltage battery 106 does not occur (if the state is good) (No in 306), the controller 102 enters the maximum efficiency section load control of the DC-DC converter 104 (320). In the maximum efficiency section load control, the DC-DC converter 104 performs balance control of power supply to the electrical load and power consumption in the electrical load in order to maintain an operation in the maximum efficiency section. However, in the maximum efficiency section load control of the DC-DC converter 104, if only one phase (phase 1) of the DC-DC converter 104 is activated, the amount of conversion current is not large, so that the maximum efficiency section load control is not performed. FIG. 7 is a view showing phase activations of the DC-DC converter 104 in the maximum efficiency section load control of the power control apparatus according to an embodiment of the present disclosure. In other words, as shown in FIG. 7, the maximum efficiency section load control is performed only when two or more phases are activated.

After entering the maximum efficiency section load control, the controller 102 performs control such as power supply control to the electrical load or battery charging according to a current consumption situation in the electrical load.

Figure 8:
FIG. 8 is a view showing a classification of a large current consuming load of the power control apparatus according to an embodiment of the present disclosure.
Figure 9:
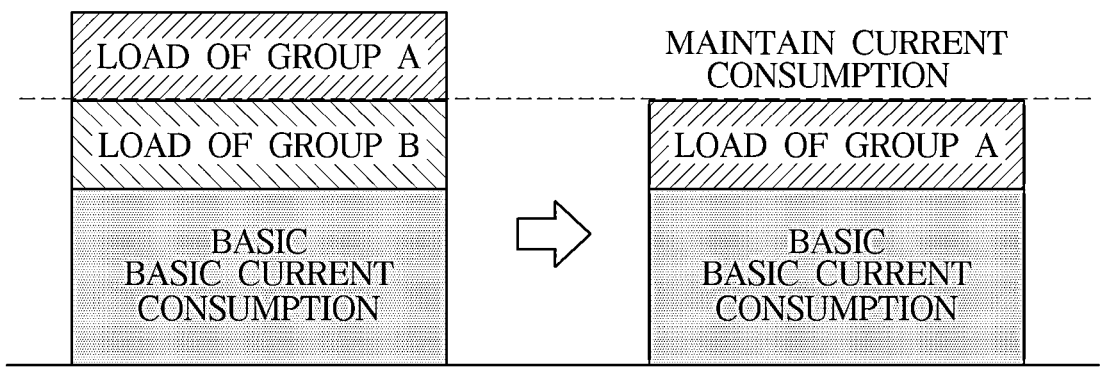
FIG. 9 is a view showing a maintenance of current consumption in an electrical load of the power control apparatus according to an embodiment of the present disclosure.

For example, after entering the maximum efficiency section load control, if a large current consuming load is in operation (YES in 322), the controller 102 may block power supply to a convenient load among loads consuming a large current in order to increase power conversion capacity of the DC-DC converter 104 (324). FIG. 8 is a view showing classification of a large current consuming load of the power control apparatus according to an embodiment of the present disclosure. As shown in FIG. 8, the large current consuming load may be divided into a group A required for driving and safety of a vehicle and a group B, which is a convenient load having relatively little relation to driving and safety. The group A includes devices that allow a vehicle to safely drive, such as a steering device, a power window device, a power seat device, a roll stabilizer device, and a rear wheel steering device, and like that. The group B includes devices that are not directly related to driving and safety of a vehicle, such as a steering wheel heating device, an air conditioning blower device, a seat heating device, a seat ventilation device, and an audio device, and like that but for convenience of occupants. If it is necessary to restrict power supply to some electrical loads for the maximum efficiency section load control, blocking power supply to electrical loads of the group B that are not directly related to driving and safety of a vehicle is desirable. Therefore, after entering the maximum efficiency section load control, if the large current consuming load is in operation (YES in 322), the controller 102 may block power supply to the group B devices, which are convenient loads, among loads consuming the large current in order to increase the power conversion capacity of the DC-DC converter 104. FIG. 9 is a view showing a maintenance of current consumption in the electrical load of the power control apparatus according to an embodiment of the present disclosure. As shown in FIG. 9, when current consumption in the group A and current consumption in the group B occur in addition to a basic current consumption, power supply to the group B is blocked and only power supply to the group A is maintained. Thus, current consumption in the electrical load may be maintained at a certain level. Accordingly, the power conversion efficiency in the DC-DC converter 104 may also be maintained at a certain level.

Returning to FIG. 3, if the large power consuming load is not in operation (No in 322), the controller 102 monitors whether the current consumed by the electrical load decreases (330).

Figure 10:
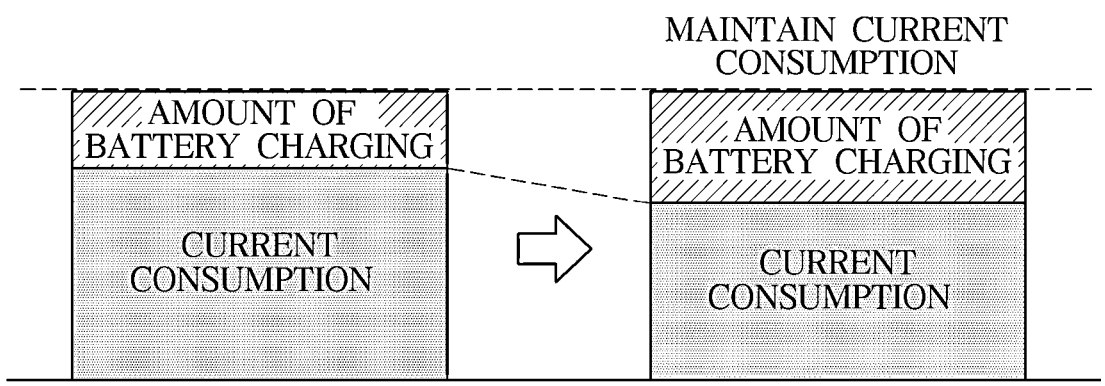
FIG. 10 is a view showing charging of a low-voltage battery according to an electrical load current consumption of the power control apparatus according to an embodiment of the present disclosure.

When the current consumption of the electrical load decreases (YES in 330), the controller 102 increases the amount of charge (also referred to as SOC) of the low-voltage battery 106 by the amount of decrease in current consumption in the electrical load (S332). FIG. 10 is a view showing charging of the low-voltage battery according to an electrical load current consumption of the power control apparatus according to an embodiment of the present disclosure. As shown in FIG. 10, if the current consumption in the electrical load is relatively large, the amount of charge of the low-voltage battery 106 is reduced by that amount to maintain a total current consumption at a certain level (left side of FIG. 10). Alternatively, if the current consumption in the electrical load is reduced, the amount of charge of the low-voltage battery 106 may be increased by the reduced amount (right side of FIG. 10). In this case, the amount of charge of the low-voltage battery 106 may be increased only when the current consumption in the electrical load decreases by a predetermined amount or more. For example, if the reduced current consumption in the electrical load is 20 A or less, the amount of charge of the low-voltage battery 106 is not increased, and only when the reduced current consumption in the electrical load exceeds 20 A, the amount of charge of the low-voltage battery 106 may be increased by the excess amount. Through such control, the power conversion efficiency of the DC-DC converter 104 may be maintained at a certain level while increasing the amount of charge of the low-voltage battery 106.

As is apparent from the above, the power control method and power control apparatus for the vehicle can secure a stability of the vehicle's power supply while increasing efficiency of power conversion of the DC-DC converter through power supply control to an electrical load and phases variable control of the DC-DC converter based on a state of a battery in the vehicle to which the multi-phase DC-DC converter is applied.

Although embodiments of the present disclosure have been shown and described, it would be appreciated by those having ordinary skill in the art that changes may be made in these embodiments without departing from the principles and spirit of the disclosure, the scope of which is defined in the claims and their equivalents.

DESCRIPTION OF SYMBOLS

102: controller
104: MULTI-phase DC-DC CONVERTER
106: LOW-voltage BATTERY
108: battery MANAGER
110: HIGH-voltage BATTERY
112: motor
114: inverter
116, 130: ELECTRICAL LOAD
120: power DIVIDER
122: switch

What is claimed is:

1. A method for controlling power of a vehicle, the method comprising:
collecting, by a controller, data on a current consumed by an electrical load of the vehicle and calculating an average current consumption for the electrical load based on the collected data on the current consumed;
determining, by the controller, power conversion of a converter to generate a converted current having an amount corresponding to the calculated average current consumption;
variably controlling, by the controller, the power conversion of the converter to compensate for a deterioration state of a battery when the deterioration state of the battery provided to supply power to the electrical load occurs; and securing, by the controller, higher power conversion efficiency of the converter by controlling power supply to the electrical load when the deterioration state of the battery does not occur.

2. The method of claim 1, wherein
the converter includes a multi-phase direct current-direct current (DC-DC) converter.

3. The method of claim 2, wherein
the variable controlling of the power conversion of the converter includes variably controlling the number of phase activations of the multi-phase DC-DC converter.

4. The method of claim 3, further comprising:
increasing, by the controller, the number of phase activations of the converter to compensate for the deterioration state of the battery when the deterioration state of the battery occurs.

5. The method of claim 3, further comprising:
determining, by the controller, that the deterioration state of the battery occurs when a state of charge (SOC) and a temperature of the battery are respectively within predetermined ranges.

6. The method of claim 3, wherein the controlling power supply to the electrical load when the deterioration state of the battery does not occur further comprises:
when the electrical load includes a large current consuming load consuming a large current greater than or equal to a predetermined amount, identifying, by the controller, whether the large current consuming load is operating; and
blocking, by the controller, power supply to a predetermined convenient load of the large current consuming load when the large current consuming load is in operation.

7. The method of claim 6, wherein
the predetermined convenient load is not directly related to driving and safety of the vehicle and is an electrical load predetermined for convenience of occupants.

8. The method of claim 6, further comprising:
identifying, by the controller, whether the current consumption in the electrical load decreases when the large current consuming load is not in operation; and
increasing, by the controller, an amount of charge of the battery by the reduced current consumption when the current consumption in the electrical load is reduced.

9. A power control apparatus for a vehicle, the apparatus comprising:
a converter configured to supply power to an electrical load and a battery; and
a controller configured to
control power supply to the electrical load and the battery by controlling the converter,
collect data on a current consumed by the electrical load of the vehicle,
calculate an average current consumption for the electrical load based on the collected data on the current consumed,
determine power conversion of the converter to generate a converted current having an amount corresponding to the calculated average current consumption,
variably control the power conversion of the converter to compensate for a deterioration state of the battery when the deterioration state of the battery provided to supply power to the electrical load occurs, and secure higher power conversion efficiency of the converter by controlling power supply to the electrical load when the deterioration state of the battery does not occur.

10. The apparatus of claim 9, wherein
the converter includes a multi-phase direct current-direct current (DC-DC) converter.

11. The apparatus of claim 10, wherein
the variable controlling of the power conversion of the converter includes variably controlling the number of phase activations of the multi-phase DC-DC converter.

12. The apparatus of claim 11, wherein
when the deterioration state of the battery occurs, the controller is configured to increase the number of phase activations of the converter to compensate for the deterioration state of the battery.

13. The apparatus of claim 11, wherein the deterioration state of the battery is determined based on a state of charge (SOC) and a temperature of the battery, and
wherein the controller is configured to determine the deterioration state of the battery occurs when the SOC and the temperature of the battery are respectively within predetermined ranges.

14. The apparatus of claim 11, wherein for controlling power supply to the electrical load when the deterioration state of the battery does not occur, the controller is configured to, when the electrical load includes a large current consuming load consuming a large current greater than or equal to a predetermined amount, identify whether the large current consuming load is operating and also configured to block power supply to a predetermined convenient load of the large current consuming load when the large current consuming load is in operation.

15. The apparatus of claim 14, wherein
the predetermined convenient load is not directly related to driving and safety of the vehicle and is an electrical load predetermined for convenience of occupants.

16. The apparatus of claim 14, wherein
the controller is configured to identify whether the current consumption in the electrical load decreases when the large current consuming load is not in operation and also configured to increase the amount of charge of the battery by the reduced current consumption when the current consumption in the electrical load is reduced.

17. A method for controlling power of a vehicle, the method comprising:

collecting, by a controller, data on a current consumed by an electrical load of the vehicle and calculating an average current consumption for the electrical load based on the collected data on the current consumed;
determining, by the controller, power conversion of a multi-phase direct current-direct current (DC-DC) converter to generate a converted current having an amount corresponding to the calculated average current consumption;
controlling, by the controller, the number of phase activations of the multi-phase DC-DC converter to increase so as to compensate for a deterioration state of a battery when the deterioration state of the battery provided to supply power to the electrical load occurs; and
securing, by the controller, higher power conversion efficiency of the multi-phase DC-DC converter by controlling power supply to be selectively restricted to the electrical load when the deterioration state of the battery does not occur.

18. A power control apparatus for a vehicle, the apparatus comprising:
a converter configured to supply power to an electrical load and a battery; and
a controller configured to
control power supply to the electrical load and the battery by controlling the converter,
collect data on a current consumed by an electrical load of the vehicle,
calculate an average current consumption for the electrical load based on the collected data on the current consumed,
determine power conversion of a multi-phase direct current-direct current (DC-DC) converter to generate a converted current having an amount corresponding to the calculated average current consumption,
increase the number of phase activations of the multi-phase DC-DC converter to compensate for a deterioration state of the battery when the deterioration state of the battery provided to supply power to the electrical load occurs, and
secure higher power conversion efficiency of the multi-phase DC-DC converter by selectively restricting power supply to the electrical load when the deterioration state of the battery does not occur.

* * * * *